June 23, 1964  W. L. SMITH  3,137,930
BATTERY SALVAGE MACHINE
Filed Jan. 15, 1962  2 Sheets-Sheet 1
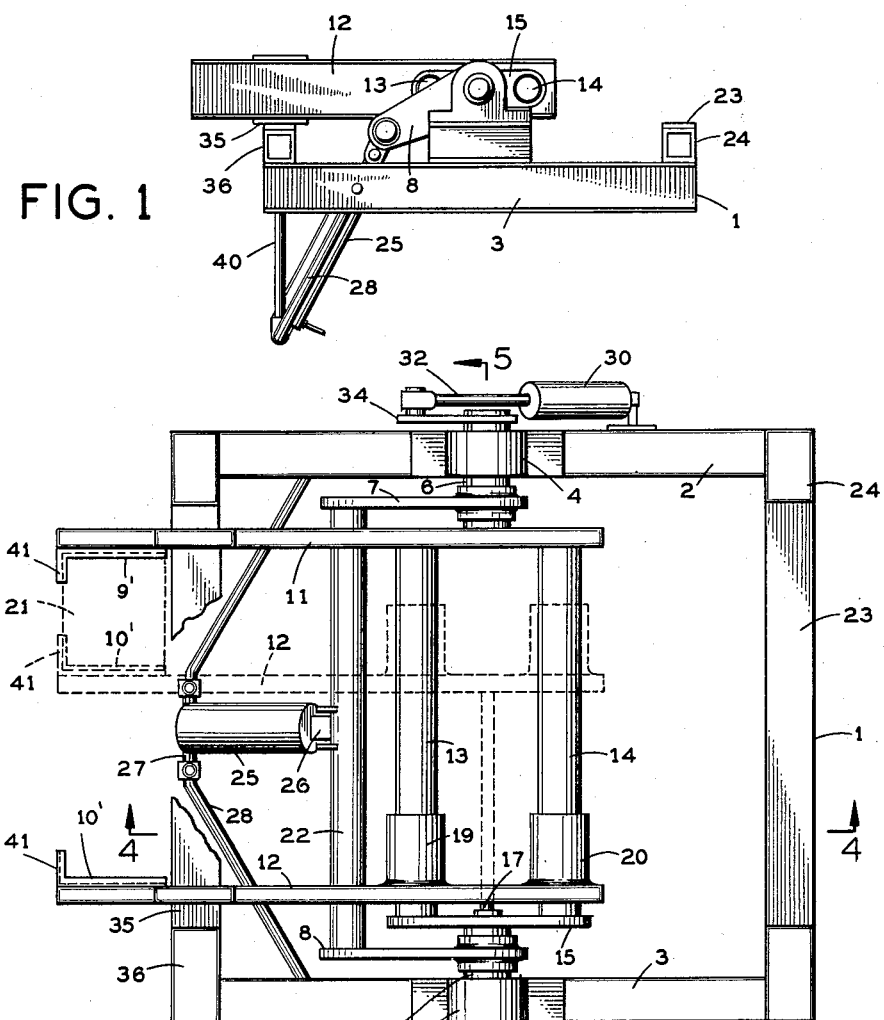
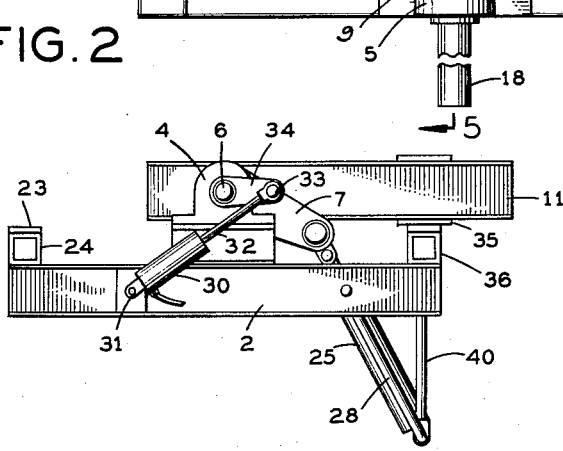
INVENTOR.
WALLACE L. SMITH
BY
ATTORNEY June 23, 1964   W. L. SMITH   3,137,930
BATTERY SALVAGE MACHINE
Filed Jan. 15, 1962   2 Sheets-Sheet 2
FIG. 4
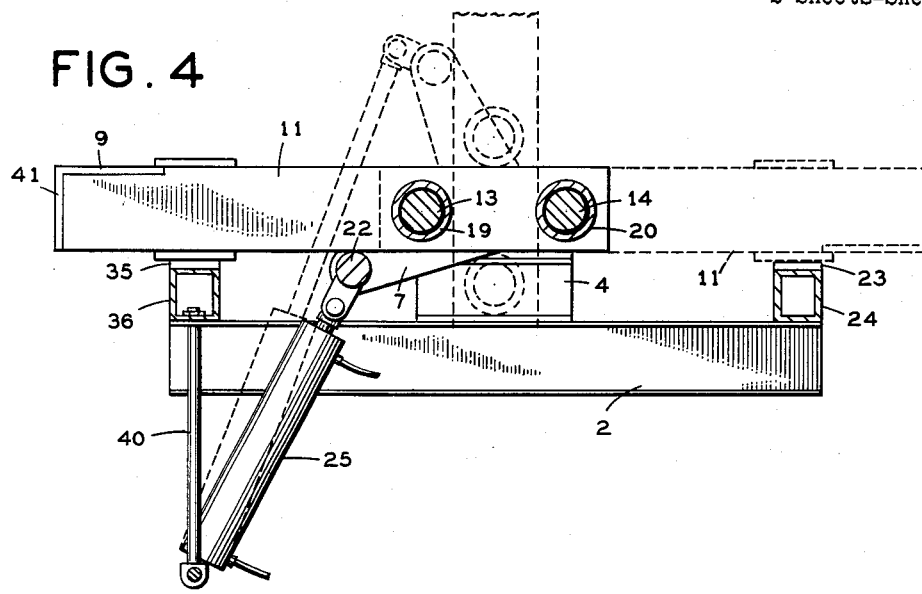
FIG. 5
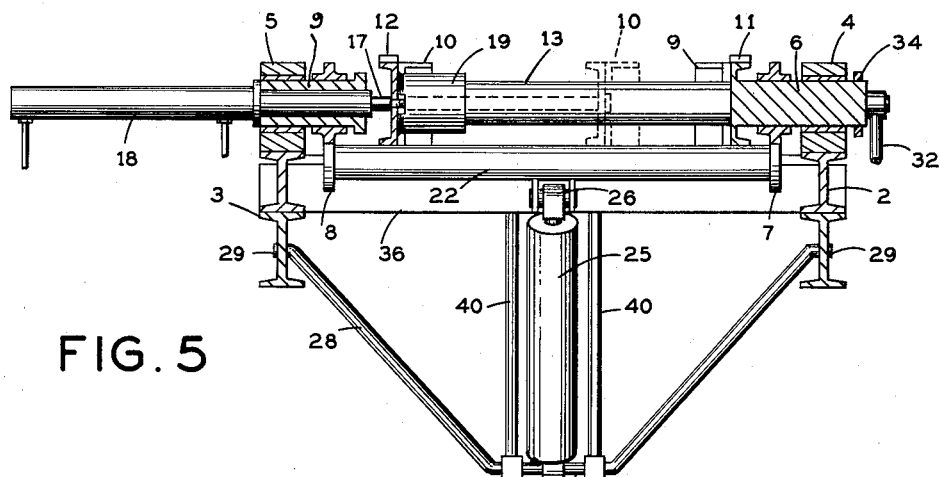
FIG. 6
INVENTOR.
WALLACE L. SMITH
BY
ATTORNEY

United States Patent Office 3,137,930
Patented June 23, 1964

3,137,930
BATTERY SALVAGE MACHINE
Wallace L. Smith, Miami, Fla.
(7751 NW. 34th St., West Hollywood, Fla.)
Filed Jan. 15, 1962, Ser. No. 166,073
1 Claim. (Cl. 29—204)

This invention relates to an apparatus for removing the lead plates from storage batteries for the purpose of reclaiming the same.

It is an object of the invention to provide a relatively simple and effective apparatus by which a storage battery can be treated in such a manner that its plates can be readily dislodged and emptied from the battery casing with a minimum of effort on the part of the operator.

More particularly, the invention contemplates the provision of a pivotal battery carriage or frame by which a battery is held and which, upon the swing of said carriage, is caused to become inverted or turned upside down and subjected to a halt with an impingement that is effective to dislodge the plates of the battery and to cause the same to fall downward and out of the battery casing. It is an object of the invention to provide means for freeing the empty battery casing from clamping means on the carriage at the conclusion of the plate-ejecting operation.

It is an object of the invention to provide means for securely holding or supporting the battery during the above-described operations, and to provide means by which the handling of the battery and causing the inversion of the same and the emptying of its contents, will be smoothly performed and be very effective for the required purpose.

With these and other objects to be hereinafter set forth in view, I have devised the arrangement of parts to be described and more particularly pointed out in the claims appended hereto.

In the accompanying drawings, wherein an illustrative embodiment of the invention is disclosed, FIG. 1 is a side elevational view of a battery-dismantling apparatus constructed in accordance with the invention;

FIG. 2 is a top plan view of the same.

FIG. 3 is a side elevational view of the apparatus as seen from the side opposite to that shown in FIG. 1;

FIG. 4 is a sectional view, taken substantially on the line 4—4 of FIG. 2, looking in the direction of the arrows;

FIG. 5 is a sectional view, taken substantially on the line 5—5 of FIG. 2, looking in the direction of the arrows, and FIG. 6 is a side elevational view similar to FIG. 3, but showing the battery carriage in a position where the battery has been inverted for the ejection of its plates.

The apparatus includes a rectangular frame, preferably but not necessarily, composed of I-beams, and generally indicated at 1. Said frame is suitably supported above a floor or other surface on legs, or other supporting means not shown. The frame of the apparatus includes upper parallel side members 2 and 3. Mounted on top of the upper side member 2 is a bearing 4 and a similar bearing shown at 5 is mounted upon the opposite side frame member 3.

Journalled in the bearing 4 is a shaft 6 on which an arm 7 is loosely mounted, and a similar arm 8 is loosely carried by a shaft 9, axially aligned with the shaft 6. The battery from which the plates are to be emptied is shown at 21 and it is clamped between a pair of holders or jaws indicated respectively at 9' and 10' and carried by a battery-transporting carriage primarily consisting of a pair of arms indicated respectively at 11 and 12 connected by cross rods 13 and 14. The battery-transporting carriage, composed of the elements above described, is adapted to be swung from the battery pick-up position shown in FIG. 1, through a 180 degree arc to the battery-inverted position of FIG. 6. The arm 11 is fixedly mounted on the shaft 6.

Fixed to the arm 11 is one end of each of the pair of rods 13 and 14 which are connected at their opposite ends to a plate 15 on the shaft 9. The piston rod 17 of a double-acting air cylinder 18 (FIG. 5) is attached to the arm 12. The arm 12 is provided with a pair of bosses 19 and 20 which are respectively slidable on the rods 13 and 14 to thereby enable the arm 12 to be moved by the piston rod 17 of the air cylinder 18 toward the arm 11 to cause a battery to be clampingly held between the jaws 9' and 10', as shown in dotted lines in FIG. 2, or movable away from the arm 11 to thereby free the battery after it has been emptied.

In FIG. 2 the apparatus is shown in the position in which it receives a battery, and after the battery is placed in an upright position with its open top uppermost and between the jaws 9' and 10' and is engaged thereby, the battery-supporting carriage is swung through an arc of 180 degrees to thus invert the battery and to dislodge its contents. The adjustment of the arm 12 toward the arm 11 enables the battery 21 to be clampingly maintained between the jaws 9' and 10' during the travel of the battery from its upright position to its inverted position. In the latter position the parts of the apparatus are in the positions shown in FIG. 6. Upon displacement of the battery plates from the battery casing, the air cylinder 18 then becomes effective to move the arm 12 away from the arm 11 to an extent sufficient to release the then-empty battery case, allowing it to fall down out of the grip of the jaws 9' and 10'.

The means for swingably lifting the battery carriage includes a bar 22 extending between the arms 7 and 8 and engaging under the arms 11 and 12 of the battery carriage. The bar 22 and the arms 7 and 8 to which it is attached, constitute a crank means or swinging frame operative to swing the battery carriage upwardly and over a vertical center line to an extent to cause the carriage to drop down by gravity and forcibly come to rest upon a facing or cushion 23 provided on top of a cross bar 24 of the frame 1. The shock of the carriage upon striking the facing 23 helps to dislodge the battery plates from the then inverted battery casing. It will be noted that the cross bar 24 of the frame 1 is disposed inwardly of the battery when the arms 11 and 12 impinge against the stop 24 so that the cross bar is no impediment to the fall of the battery plates out of the battery casing.

The piston rod 26 of an air cylinder 25 is connected to the bar 22, the cylinder being pivotally attached at 27 to a yoke-like frame 28 mounted at 29 in the side frame members 2 and 3 and braced by rods 40. The cylinder 25 is effective to cause lifting movement of the battery carriage as above described, to a point beyond vertical center and then the carriage will descend to contact the facing 23 and dislodge the contents out of the battery casing.

The means for returning the battery-transporting carriage to its battery pick-up position, includes an air cylinder 30 having one end pivotally attached at 31 to frame member 2 and having its piston rod 32 pivotally connected at 33 to an arm 34 secured on the shaft 6. This arrangement is such that after the battery has been inverted or turned upside down by the swing of its transporting carriage to the position shown in FIG. 6 and the contents of the battery casing have been dropped out of the casing, and the battery casing has been released from the grip of the jaws 9' and 10' and has been caused to drop from the carriage, the air cylinder 30 will become effective to swing the carriage through a return arc to its battery pick-up position shown in FIGS. 1 and 2. In this position, the arms 11 and 12 of the carriage will come to rest and be supported upon a facing or pad 35 mounted on the top of the frame cross-bar 36.

From the foregoing, the operation of the improved battery-dismantling apparatus will be readily apparent. In the position of the apparatus shown in FIGS. 1 and 2, the battery carriage has the battery placed between its jaws 9′ and 10′ which, by movement of the arm 12 toward the arm 11, is caused to be firmly clamped between the jaws and securely held thereby. It will be noted that each of the jaws 9′ and 10′ has an inturned flange 41 which fits over the outer end of the battery casing and prevents displacement of the battery during the swing of the carriage from battery pick-up position to discharge position.

The air cylinder 25 is caused to swing the cross-rod 22 upwardly so that the same, engaging under the arms 11 and 12 of the battery carriage, lifts the carriage and the battery carried by it. The carriage and the battery reach a point in the arc of swing of the carriage, beyond the vertical center line, and the carriage and its battery will then descend by gravity, until the arms 11 and 12 forcibly contact the facing or pad 23 and the impact therewith will cause the plates of the battery to be ejected from the battery casing. The arm 12 is then retracted or moved in a direction away from the arm 11 by operation of the air cylinder 18, to thereby free the battery casing from its position between the jaws 9′ and 10′ and the battery casing, thus freed from the carriage, will fall down. Since the battery casing is held by parts of the arms 11 and 12 which are positioned beyond the frame member 24, the battery casing will be free to fall down by gravity as soon as it is released. The battery carriage is then swung back to its pick-up position shown in FIGS. 1 and 2 by operation of the air cylinder 30 to receive another battery and to repeat the cycle just described.

Having thus described a single embodiment of the invention, it is obvious that the same is not to be restricted thereto, but is broad enough to cover all structures coming within the scope of the annexed claim.

What I claim is:

A device for removing the plates from a storage battery comprising, a pivoted battery transporting carriage comprising a pair of arms connected by cross rods, one of the arms being slidably mounted on said cross rods so that said arm can be adjusted toward or away from the other arm, jaws on the arms between which a battery is held while the carriage is swung through an arc, a pivoted lifter frame operative below the carriage and effective to raise the carriage to a point beyond vertical center, air-actuated means for raising the lifter frame, a fixed horizontal bar having a facing against which the arms of the carriage impinge upon the descent of the carriage to battery-emptying position, said bar being located inwardly of the jaws, air-actuated means for moving one of the arms away from the other arm at the conclusion of the battery-emptying operation to thereby free the empty battery casing from the carriage and permit it to drop down therefrom by gravity, and air-actuated means for causing a return swing of the carriage from battery-emptying position to battery pick-up position.

References Cited in the file of this patent

UNITED STATES PATENTS

| 1,561,664 | Rathwell | Nov. 17, 1925 |
| 2,701,071 | Cavalieri | Feb. 1, 1955 |
| 2,828,534 | Pitts et al. | Apr. 1, 1958 |
| 2,967,350 | Morehart | Jan. 10, 1961 |